United States Patent [19]

Okada

[11] Patent Number: 4,706,234

[45] Date of Patent: Nov. 10, 1987

[54] HEAD FEED CONTROL APPARATUS

[75] Inventor: Hiroo Okada, Ina, Japan

[73] Assignee: Olympus Optical Co., Ltd., Tokyo, Japan

[21] Appl. No.: 838,107

[22] Filed: Mar. 10, 1986

[30] Foreign Application Priority Data

Mar. 19, 1985 [JP] Japan .................................. 60-54886

[51] Int. Cl.⁴ ............................................ G11B 17/06
[52] U.S. Cl. ....................................... 369/41; 369/215; 369/244
[58] Field of Search .......................... 369/41, 215, 244

[56] References Cited

U.S. PATENT DOCUMENTS 4,445,583 6/1984 Schultz ................................. 360/78
4,509,154 4/1985 Kimoto ................................. 369/41

FOREIGN PATENT DOCUMENTS 59-175082 3/1984 Japan .

Primary Examiner—Steven L. Stephan
Attorney, Agent, or Firm—Frishauf, Holtz, Goodman & Woodward

[57] ABSTRACT

A head feed control apparatus for a recording/reproducing system using a disk-like data recording medium with a plurality of concentric tracks thereon includes a linear scale mounted on a head and provided with graduations at predetermined intervals, and a scale detector for reading the graduations of the linear scale. This apparatus performs sampling and access operations. In sampling, the head is moved by a predetermined number of graduations of the scale, and a corresponding address is read to detect the number of tracks of each recording medium zone which corresponds to the predetermined number of graduations and to store (the predetermined number of graduations)÷(the number of tracks) as a zone parameter. In access operation, the head is moved by the number of scale graduations corresponding to (an average value of parameters between a zone where the head is currently located and a zone where a target track is located)×(the number of tracks between the current and target tracks), and thereafter fine adjustment of the head position is performed.

7 Claims, 5 Drawing Figures

HEAD FEED CONTROL APPARATUS

BACKGROUND OF THE INVENTION

The present invention relates to a head feed control apparatus for a recording/reproducing apparatus using a disk-like recording medium.

Data recording tracks (to be referred to as tracks hereinafter) are concentrically or helically formed on a disk-like recording medium, such as an optical disk. A given track is traced by a head and irradiated with a laser beam to record data thereon or read it out therefrom. When data write/read operation is to be performed for successive tracks, the successive tracks can be irradiated with the laser beam by optical head tracking. However, if the tracks are to be random accessed, an access operation for moving the head to a remote track is required.

In the simplest access operation, the number of tracks crossed by the head is counted while the head is moved to adjacent tracks. When it is determined that the head has been moved to a target track on the basis of the count, the head is stopped. According to this scheme, the head can be properly moved to the target track. However, it is necessary to detect that the head crosses the tracks, thus prolonging the access time. Since high-density tracks at 1.6-μm track spacings or pitch are used in recent years and the number of tracks are tens of thousands, the above access operation is unsatisfactory.

In order to eliminate this drawback, an access operation using an external scale has been recently employed. The external scale has graduations, the pitch or spacing of which is larger than the track pitch. A head feed control apparatus with the external scale is shown in FIG. 1. Disk-like recording medium 1 is rotated by spindle motor 2. A plurality of tracks 11 are concentrically formed on medium 1. Head 3 mounted on carriage 100 traces these tracks 11. Linear scale 4 is mounted on carriage 100 to move with head 3. Graduations 41 are formed on scale 4 at a predetermined pitch. Graduations 41 are read by scale detector 5 to detect an amount of displacement of head 3. Scale 4 comprises an optical or magnetic scale, or a potentiometer operated upon movement of the head 3.

For example, if pitches of tracks 11 and graduations 41 are respectively given as 2 μm and 20 μm, the graduation pitch of scale 4 corresponds to a 10-track displacement of head 3. Assume that the head located at track address 1000 is moved to a position at track address 1204, so that the head is moved by 204 tracks to a target track. Since 204/10=20.4, the head is moved by 20 graduations of scale 4 at high speed and then crosses four tracks one by one, thus achieving high-speed access operation.

However, a method using the scale may not be able to accurately move the head to the target track. When tracks are formed in the recording medium during its fabrication process, errors occur in the track pitch and scale graduation pitch. Disks are normally prepared by pressing with a master disk having accurate concentric tracks. All tracks are not always formed at equal intervals due to errors caused by different pressing pressures. This is also the case in the scale. For example, each pitch of graduations may not always correspond to a pitch of 10 tracks. In the access operation based on the scale, which neglects track pitch and scale graduation errors, the head cannot often be moved precisely to a target track.

SUMMARY OF THE INVENTION

It is an object of the present invention to provide a head feed control apparatus wherein a head can be accurately moved to a target track irrespective of track pitch and scale graduation errors.

In order to achieve the above object of the present invention, there is provided a head feed control apparatus comprising scale means for measuring a displacement of the head, means for detecting a ratio of a pitch of graduations of the scale means to a pitch of tracks of a recording medium, and means for moving the head in accordance with the ratio detected by the detecting means.

DETAILED DESCRIPTION OF THE PREFERRED EMBODIMENT

A head feed control apparatus according to an embodiment of the present invention will be described with reference to the accompanying drawings.

Figure 1:
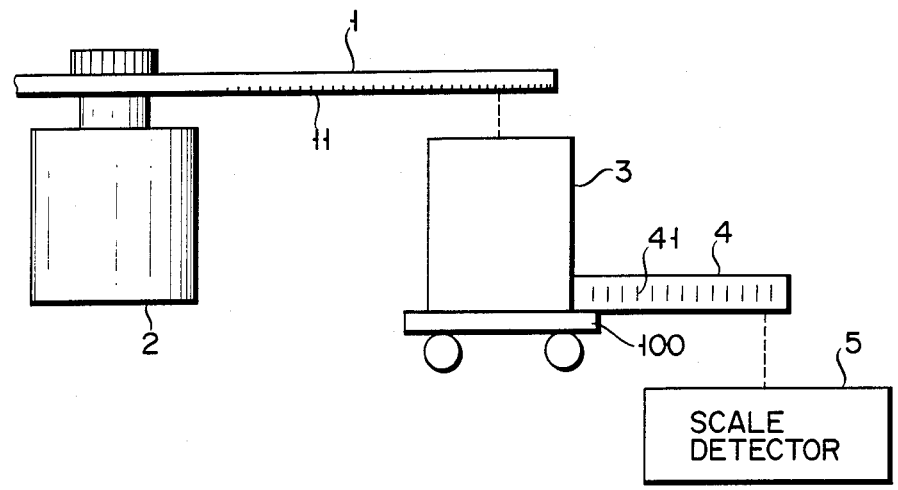
FIG. 1 is a block diagram of a conventional head feed control apparatus.
Figure 2:
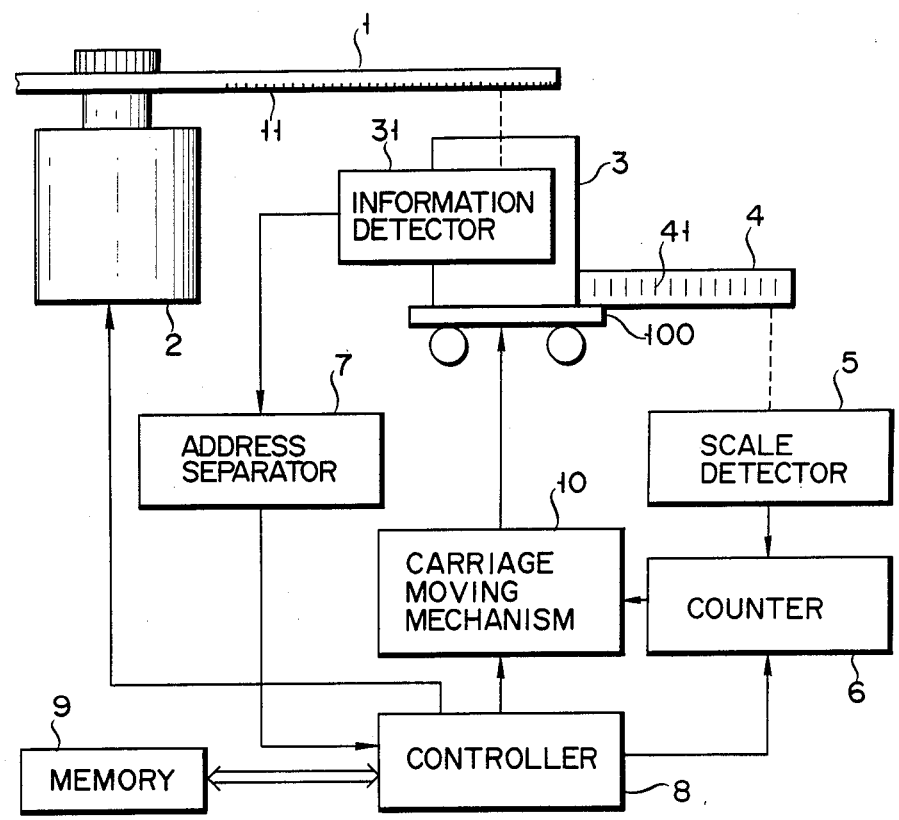
FIG. 2 is a block diagram of a head feed control apparatus according to an embodiment of the present invention.

FIG. 2 is a block diagram of a head feed control apparatus according to an embodiment of the present invention. Disk-like data recording medium 1 (an optical disk in this embodiment) is rotated by spindle motor 2. A plurality of tracks 11 are concentrically formed on medium 1. Optical head 3 for radiating a laser beam onto medium 1 to detect recorded data by light reflected by medium 1 is arranged on carriage 100 movable along the radical direction of medium 1. Head 3 traces tracks 11, and a laser beam from head 3 is incident on given track 11. Linear scale 4 is mounted on carriage 100 and can be moved with head 3. Graduations 41 are formed in scale 4 at a predetermined pitch. Graduations 41 can be read by scale detector 5 upon movement of head 3 to measure a displacement of head 3. Detector 5 successively produces pulses during movement of head 3. The number of pulses corresponds to the amount of displacement. Pulses are not produced when head 3 is not moved. Scale 4 can comprise an optical or magnetic scale, or a potentiometer operated upon movement of the head. Devices described in U.S. Pat. No. 4,481,613 can be used as scale 4 and detector 5.

An output from detector 5 is supplied to counter 6. Preset data in accordance with the desired amount of displacement is preset in counter 6 by controller 8. Counter 6 down-counts pulses from detector 5. When the count of counter 6 reaches 0, it supplies a stop signal to carriage moving mechanism 10. Controller 8 includes a microcomputer. Memory 9 storing varous types of data is connected to controller 8.

Information detector 31 is arranged in head 3 to read data and an address of track 11 currently accessed by head 3. Track addresses are numbers assigned to tracks from the innermost to outermost track and are recorded in the respective tracks. An output from detector 31 is supplied to address separator 7. Track addresses are separated from data in separator 7. An output from separator 7 is supplied to controller 8.

Controller 8 causes carriage 100 to move along the radial direction of medium 1 through carriage moving mechanism 10. The movement of the carriage 100 is terminated by the stop signal from counter 6. Mechanism 10 includes a voice coil motor.

Figure 3:
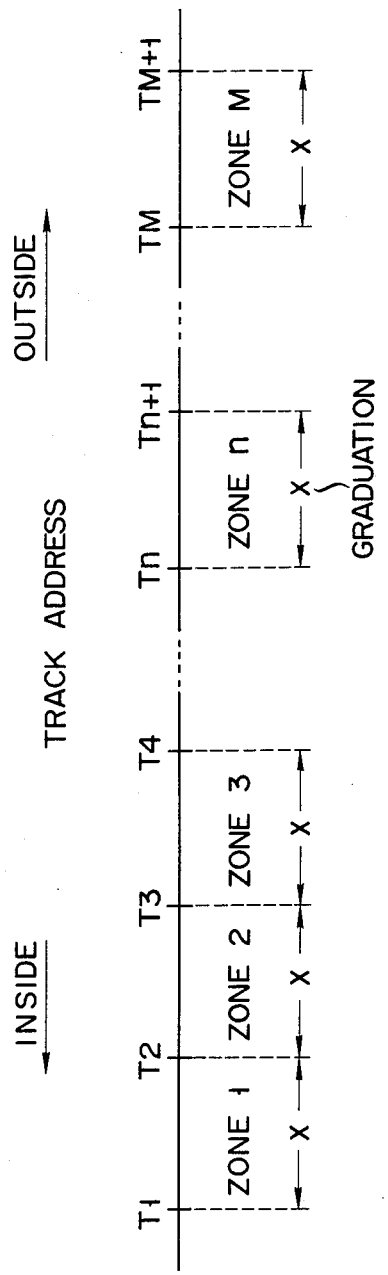
FIG. 3 is a chart showing the relationship between the scale graduations and the tracking addresses in the apparatus of FIG. 2.

The operation of the head feed control apparatus of this embodiment will be described below. Sampling is performed before access operation. Sampling aims at checking the relationship between the pitch of tracks 11 of medium 1 and the pitch of graduations 41 of scale 4. If this relationship is checked and stored in memory 9, sampling is performed only once before each new medium 1 is used. When sampling is performed for all graduations 41 of scale 4, highest precision is obtained. In this case, however, the sampling time must be prolonged, so a proper sampling interval is determined in consideration of precision of medium 1. As shown in FIG. 3, assume that track addresses are sampled for every x graduations of scale 4. The regions of the recording medium which correspond to x graduations of scale 4 are defined as zones.

Figure 4:
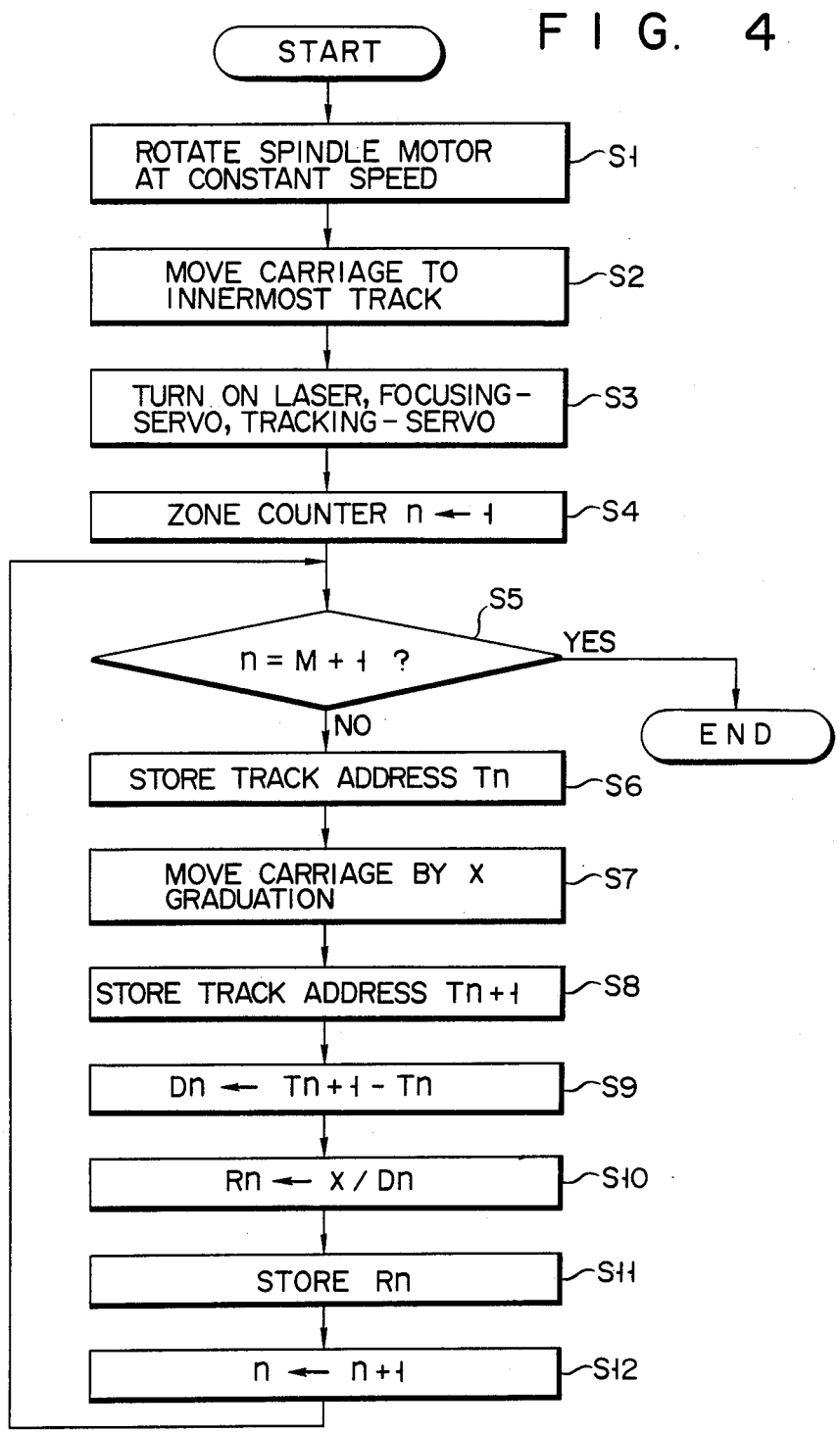
FIG. 4 is a flow chart for explaining a sampling operation of the apparatus in FIG. 2.

Sampling will be described with reference to a flow chart of FIG. 4. When the operation is started, medium 1 is rotated by motor 2 at a constant speed in step S1. In step S2, head 3 is moved to the innermost track (corresponding to track address T1) upon movement of carriage 100. Sampling is thus performed while the head is moved from the innermost to outermost track (corresponding to track address M+1). Sampling can be performed while the head is being moved from the outermost to innermost track. In step S3, the laser beam is generated to perform focus and tracking servo operations, thereby preparing for reading of track addresses.

Count n of a zone counter is set to be "1", which represents that the head is currently located on the innermost track of a specific zone. Controller 8 then checks in step S5 if the current position of the head exceeds the outermost zone. In other words, controller 8 checks if count n is M+1. If YES in step S5, sampling is ended.

However, if NO in step S5, address Tn of the most internal track in zone n being traced is read and stored in memory 9 in step S6.

In step S7, the carriage is moved by x graduations. Upon movement of the carriage, the head is moved to the innermost track in the next outer zone (n+1). In step S8, address Tn+1 is read and stored in memory 9. In step S9, a difference Dn(=Tn+1−Tn) between track addresses Tn+1 and Tn is calculated. Since track addresses are sequentially assigned to the tracks, difference Dn corresponds to the number of tracks crossed by the head upon its movement by x graduations, i.e., the number of tracks within zone n. In step S10, ratio Rn(=x/Dn) of x to Dn is calculated. Ratio Rn is a parameter representing the ratio of scale graduations to track number within zone n. Ratio Rn is stored in memory 9 in step S11. The count of the zone counter is incremented by one in step S12. The operations after step S5 are performed. Sampling continues until the head reaches the outermost track of the outermost zone. When sampling is completed, parameters R1 to RM representing ratios of the scale graduation numbers to the track numbers of the respective zones are stored in memory 9.

Figure 5:
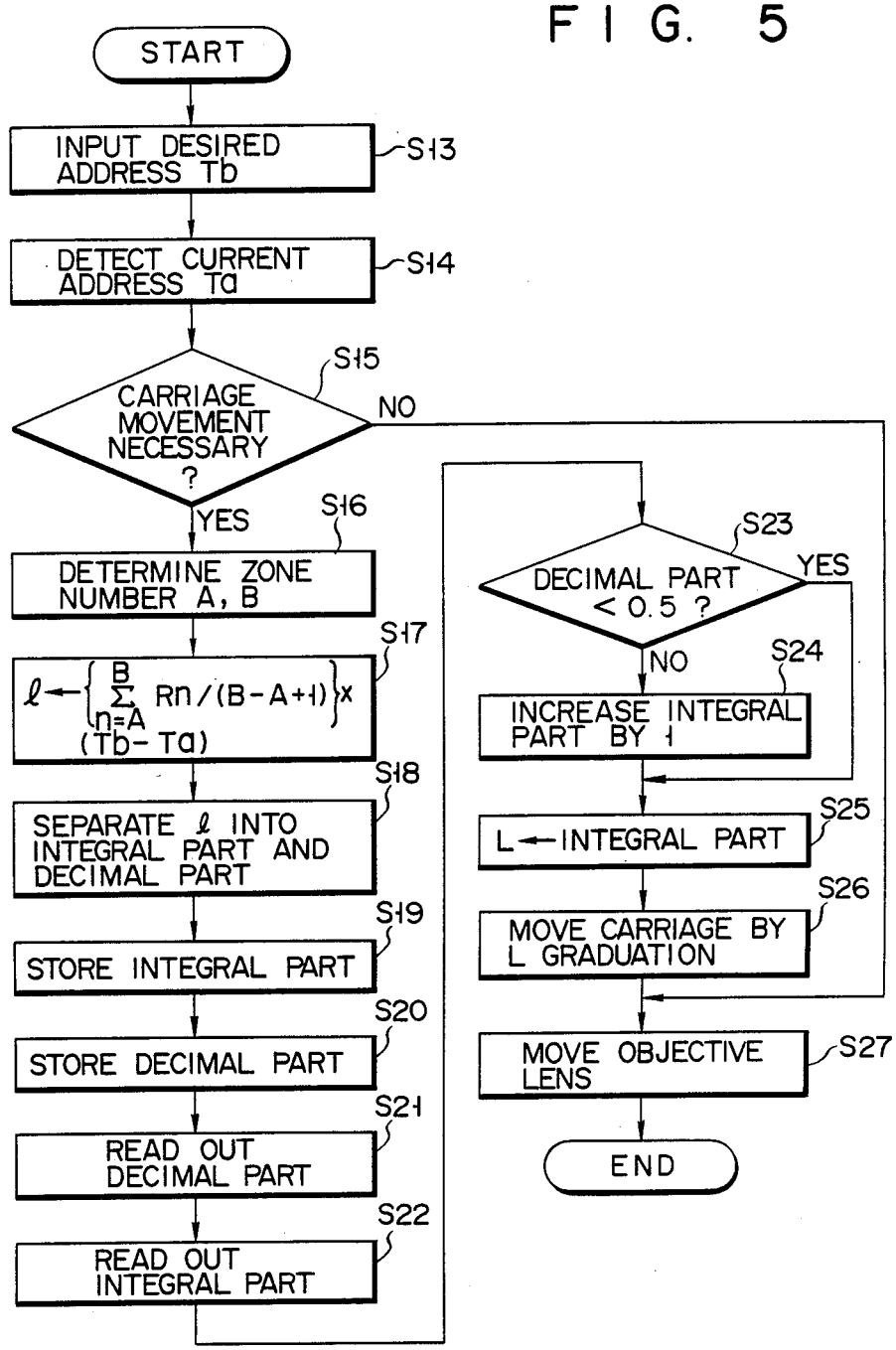
FIG. 5 is a flow chart showing an access operation of the apparatus in FIG. 2.

The access operation using the sampling results will be described with reference to a flow chart of FIG. 5. Desired track address Tb of the target track is input in step S13. In step S14, current track address Ta is detected. Controller 8 checks in step S15 if carriage movement is necessary. When a distance between the tracks of addresses Ta and address Tb falls within an objective lens movement range, the carriage need not be moved. In this case, the objective lens is moved within the head to complete the access operation. When controller 8 determines that carriage movement is unnecessary, the objective lens is moved in step S27 so as to perform fine adjustment.

If YES in step S15, zone numbers A and B (=1 to M) including addresses Ta and Tb are calculated in step S16. Zone number calculations are performed by comparing addresses of the innermost tracks of the zones, which are stored in memory 9. If $Tn \leq Ta(Tb) < Tn+1$, the zone number is given as n. In step S17, a moving distance of the head on the graduations of the scale is given by the following equation:

$$l = \sum_{n=A}^{B} Rn/(B - A + 1) \times (Tb - Ta)$$

The first and second terms of the right-hand side is an average value of ratios Rn of the scale graduation numbers to track numbers in a region from zone A to zone B and represents a correspondence between one track interval and graduations on the memory. Value l represents the number of scale graduations between track addresses Ta and Tb. Since l may include a decimal part, it is rounded, and the rounded value is input. More specifically, in step S18, l is divided into an integral part and a decimal part. In step S19, the integral part is stored in memory 9. In step S20, the decimal part is stored in memory 9. In step S21, the decimal part is read out from memory 9. In step S22, the integral part is read out from memory 9. Controller 8 checks in step S23 if the decimal part is less than 0.5. If YES in step S23, step S24 is skipped. However, if NO in step S23, the integral part is incremented by one in step S24. The integral part is set in variable L in step S25. In steps S23 to S25, one of two graduations of scale 4 sandwiching target track Tb, which is closer to the target track is detected.

In step S26, the carriage is moved by L graduations. Then, the head is moved near the target track.

Thereafter, fine adjustment by movement of the objective lens is performed in step S27. The objective lens is moved upon energization of the coil arranged in the head. Fine adjustment can be performed by moving the lens track by track and reading the address every time the lens is moved. Alternatively, pulses corresponding to a track difference can be applied to the coil to move the lens. After lens movement, the address is read again to move the lens by a remaining difference.

According to the present invention, the relationship (ratio) between the actual pitch of the tracks of each recording medium and the actual pitch of the scale graduations is measured, and a measured value is stored. The head can be accurately moved near the track corresponding to the target address on the basis of the ratio data and the scale graduations at high speed. Therefore, an accurate access operation can be performed within a short period of time.

The present invention is not limited to the particular embodiment described above. Various changes and modifications may be made within the spirit and scope of the invention. For example, instead of rounding l, the integral part of l may be used. In the above embodiment, detector 5 is fixed and scale 4 is mounted on head 3. However, scale 4 may be fixed, and detector 5 may be mounted on head 3. A recording medium may be a magnetic disk or a capacitive disk in addition to the optical disk described above. The shape of the recording medium is not limited to a disk-like shape, but can be extended to a tape- or card-like shape.

What is claimed is:

1. A head feed control apparatus, comprising:

scale means having graduations of a certain pitch, for measuring a feed amount of a head relative to a recording medium having recording tracks at a pitch smaller than said certain pitch;

sampling means for moving the head by a predetermined number of graduations of said scale means, and for counting the tracks of the recording medium within the predetermined number of graduations;

means for storing a ratio of a number of tracks counted by said sampling means, to the predetermined number of graduations; and head feed control means for feeding the head a desired number of tracks between a current track and a target track, in accordance with the ratio stored by said storing means.

2. An apparatus according to claim 1, wherein said sampling means comprises means for successively moving the head by a predetermined number of graduations of said scale means, means for reading a track address in each track crossed by the head every time the head is moved by the predetermined number of graduations and for detecting the number of tracks in each of successive zones of the recording medium wherein each zone corresponds to the predetermined number of graduations, and means for storing ratios corresponding to (the predetermined graduations)÷(the number of detected tracks) for each zone.

3. An apparatus according to claim 2, wherein said head feed control means includes means for feeding the head by a determined number of scale graduations corresponding to a product of the stored ratios and the number of tracks between the current and the target tracks, and means for finely adjusting the head position after the head is moved the determined number of scale graduations.

4. An apparatus according to claim 3, wherein said head feeding means feeds the head by the determined number of scale graduations corresponding to (an average value of the stored ratios between a zone where the head is currently located and a zone where a target track is located)×(the number of tracks between the current and target tracks).

5. An apparatus according to claim 1, wherein said scale means comprises a scale arranged to move together with the head, and a scale reader for reading graduations of the scale upon movement of the head.

6. An apparatus according to claim 1, wherein said sampling means and said storing means are adapted to operate only once before a recording/reproducing operation when the recording medium is set relative to the head.

7. An apparatus according to claim 2, wherein said sampling means causes the head to move across all of the tracks of the recording medium.

* * * * *